(12) United States Patent
Mukherjee

(10) Patent No.: US 11,604,873 B1
(45) Date of Patent: Mar. 14, 2023

(54) NOISY INSTRUCTIONS FOR SIDE-CHANNEL ATTACK MITIGATION

(71) Applicant: Marvell Asia Pte, Ltd., Singapore (SG)

(72) Inventor: Shubhendu Sekhar Mukherjee, Southborough, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 358 days.

(21) Appl. No.: 17/081,126

(22) Filed: Oct. 27, 2020

Related U.S. Application Data

(60) Provisional application No. 62/944,265, filed on Dec. 5, 2019.

(51) Int. Cl.
| | |
|---|---|
| G06F 21/54 | (2013.01) |
| G06F 7/58 | (2006.01) |
| G06F 9/22 | (2006.01) |
| G06F 9/38 | (2018.01) |
| G06F 21/56 | (2013.01) |

(52) U.S. Cl.
CPC .............. *G06F 21/54* (2013.01); *G06F 7/588* (2013.01); *G06F 9/226* (2013.01); *G06F 9/3802* (2013.01); *G06F 21/566* (2013.01); *G06F 2221/034* (2013.01)

(58) Field of Classification Search
CPC .. G06F 9/30181; G06F 9/3836; G06F 9/3867; G06F 9/30101; G06F 9/226; G06F 9/3802; G06F 21/566; G06F 2221/034; G06F 7/588; G06F 21/54
See application file for complete search history.

(56) References Cited

U.S. PATENT DOCUMENTS

| | | | |
|---|---|---|---|
| 10,540,181 B2 | 1/2020 | Mukherjee et al. | |
| 11,403,101 B1 | 8/2022 | Sugumar | |
| 2012/0144205 A1* | 6/2012 | Shu ........................ | G06F 21/85 |
| | | | 713/189 |
| 2015/0106872 A1 | 4/2015 | Hiser et al. | |

(Continued)

FOREIGN PATENT DOCUMENTS

WO         2020255144 A1     12/2020

OTHER PUBLICATIONS

Demme et al., "A Quantitative, Experimental Approach to Measuring Processor Side-Channel Security", IEEE Micro, pp. 68-77, May/Jun. 2013.

(Continued)

*Primary Examiner* — Paul E Callahan
(74) *Attorney, Agent, or Firm* — Young Basile Hanlon & MacFarlane, P.C.

(57) ABSTRACT

Described herein are systems and methods using noisy instructions for side-channel attack mitigation. For example, some methods include fetching an instruction from a memory into a processor pipeline of a processor core that is configured to execute instructions using an architectural state of the processor core; generating a random number; fissioning the instruction into a set of micro-operations that includes one or more micro-operations that perform the instruction and the random number of noisy micro-operations, wherein each of the noisy micro-operations does not affect the architectural state; executing the set of micro-operations using one or more execution units of the processor pipeline; and, retiring, responsive to completion of execution of the set of micro-operations, the instruction.

25 Claims, 7 Drawing Sheets

(56) References Cited

U.S. PATENT DOCUMENTS

| | | |
|---|---|---|
| 2018/0096139 A1 | 4/2018 | Gao |
| 2018/0211017 A1* | 7/2018 | Homescu ................ G06F 21/14 |
| 2020/0004992 A1* | 1/2020 | Chong ................ G06F 21/6218 |
| 2020/0151305 A1* | 5/2020 | Lam .......................... G06F 8/41 |
| 2020/0201604 A1 | 6/2020 | Felix et al. |
| 2022/0083347 A1 | 3/2022 | Constable et al. |

OTHER PUBLICATIONS

Aldaya et al., "Port Contention for Fun and Profit", 2019 IEEE Symposium on Security and Privacy, pp. 870-887, Date of Conference: May 19-23, 2019, Date published online for download availability: Sep. 16, 2019.

Thomas E. Tkacik, "A Hardware Random Number Generator" CHES 2002, LNCS 2523, pp. 450-453, 2003.

Braun et al.; Robust and Efficient Elimination of Cache and Timing Side Channels; 2015 (Year: 2015).

Brotzman et al.; Ghost Thread: Efective User-Space Cache Side Channel Protection; 2021 (Year: 2021).

Rane et al.; Raccoon: Closing Digital Side-Channels through Obfuscated Execution; 2015 (Year: 2015).

Townley et al.; SMT-COP: Defeating Side-Channel Attacks on Execution Units in SMT Processors; 2019 (Year: 2019).

Crane et al. Thwarting Cache Side-Channel Attacks Through Dynamic Software Diversity; 2015 (Year: 2015).

Irwin et al.; Instruction Stream Mutation for Non-Deterministic Processors; 2002 (Year: 2002).

Bayrak et al.; An Architecture-Independent Instruction Shuffler to Protect against Side-Channel Attacks; 2012 (Year 2012).

\* cited by examiner

US 11,604,873 B1

NOISY INSTRUCTIONS FOR SIDE-CHANNEL ATTACK MITIGATION

CROSS-REFERENCE TO RELATED APPLICATION(S)

This application claims priority to and the benefit of U.S. Provisional Application Patent Ser. No. 62/944,265, filed Dec. 5, 2019, the entire disclosure of which is hereby incorporated by reference.

TECHNICAL FIELD

This disclosure relates to noisy instructions for side-channel attack mitigation.

BACKGROUND

A processor pipeline includes multiple stages through which instructions advance, a cycle at a time. In a scalar processor, instructions proceed one-by-one through the pipeline, with at most a single instruction being committed per cycle. In a superscalar processor, multiple instructions may proceed through the same pipeline stage at the same time, allowing more than one instruction to issue per cycle, depending on certain conditions (called hazards), up to an issue width. Some processors issue instructions in-order (according to a program order), with consecutive instructions proceeding through the pipeline in program order. Other processors allow instructions to be reordered and issued out-of-order, which potentially increases overall pipeline throughput. If reordering is allowed, instructions can be reordered within a sliding instruction window (whose size can be larger than the issue width), and a reorder buffer can be used to temporarily store results (and other information) associated with instructions in the instruction window to enable the instructions to be committed in-order (potentially allowing multiple instructions to be committed in the same cycle as long as they are contiguous in the program order).

SUMMARY

Disclosed herein are implementations of noisy instructions for side-channel attack mitigation.

A first aspect of the disclosed implementations is an integrated circuit for executing instructions, comprising: a processor core including a processor pipeline that is configured to execute instructions using an architectural state of the processor core, a memory configured to store instructions, and in which the integrated circuit is configured to: fetch an instruction from the memory into the processor pipeline; generate a random number; fission the instruction into a set of micro-operations that includes one or more micro-operations that perform the instruction and the random number of noisy micro-operations, wherein each of the noisy micro-operations does not affect the architectural state; execute the set of micro-operations using one or more execution units of the processor pipeline; and, retire, responsive to completion of execution of the set of micro-operations, the instruction.

A second aspect of the disclosed implementations is a method that includes: fetching an instruction from a memory into a processor pipeline of a processor core that is configured to execute instructions using an architectural state of the processor core; generating a random number; fissioning the instruction into a set of micro-operations that includes one or more micro-operations that perform the instruction and the random number of noisy micro-operations, wherein each of the noisy micro-operations does not affect the architectural state; executing the set of micro-operations using one or more execution units of the processor pipeline; and, retiring, responsive to completion of execution of the set of micro-operations, the instruction.

A third aspect of the disclosed implementations is an integrated circuit for executing instructions, comprising: a processor core including a processor pipeline that is configured to execute instructions using an architectural state of the processor core, a memory configured to store instructions, and in which the integrated circuit is configured to: fetch an instruction from the memory into the processor pipeline; randomly select an instruction type from among a set of types of available noisy micro-operations; fission the instruction into a set of micro-operations that includes one or more micro-operations that perform the instruction and a noisy micro-operation of the selected instruction type, wherein the noisy micro-operations does not affect the architectural state; execute the set of micro-operations using one or more execution units of the processor pipeline; and, retire, responsive to completion of execution of the set of micro-operations, the instruction.

These and other aspects of this disclosure are disclosed in the following detailed description of the implementations, the appended claims and the accompanying figures.

BRIEF DESCRIPTION OF THE DRAWINGS

The disclosure is best understood from the following detailed description when read in conjunction with the accompanying drawings, wherein like reference numerals refer to like parts throughout the several views. It is emphasized that, according to common practice, the various features of the drawings are not to-scale. On the contrary, the dimensions of the various features are arbitrarily expanded or reduced for clarity.

DETAILED DESCRIPTION

Figure 1:
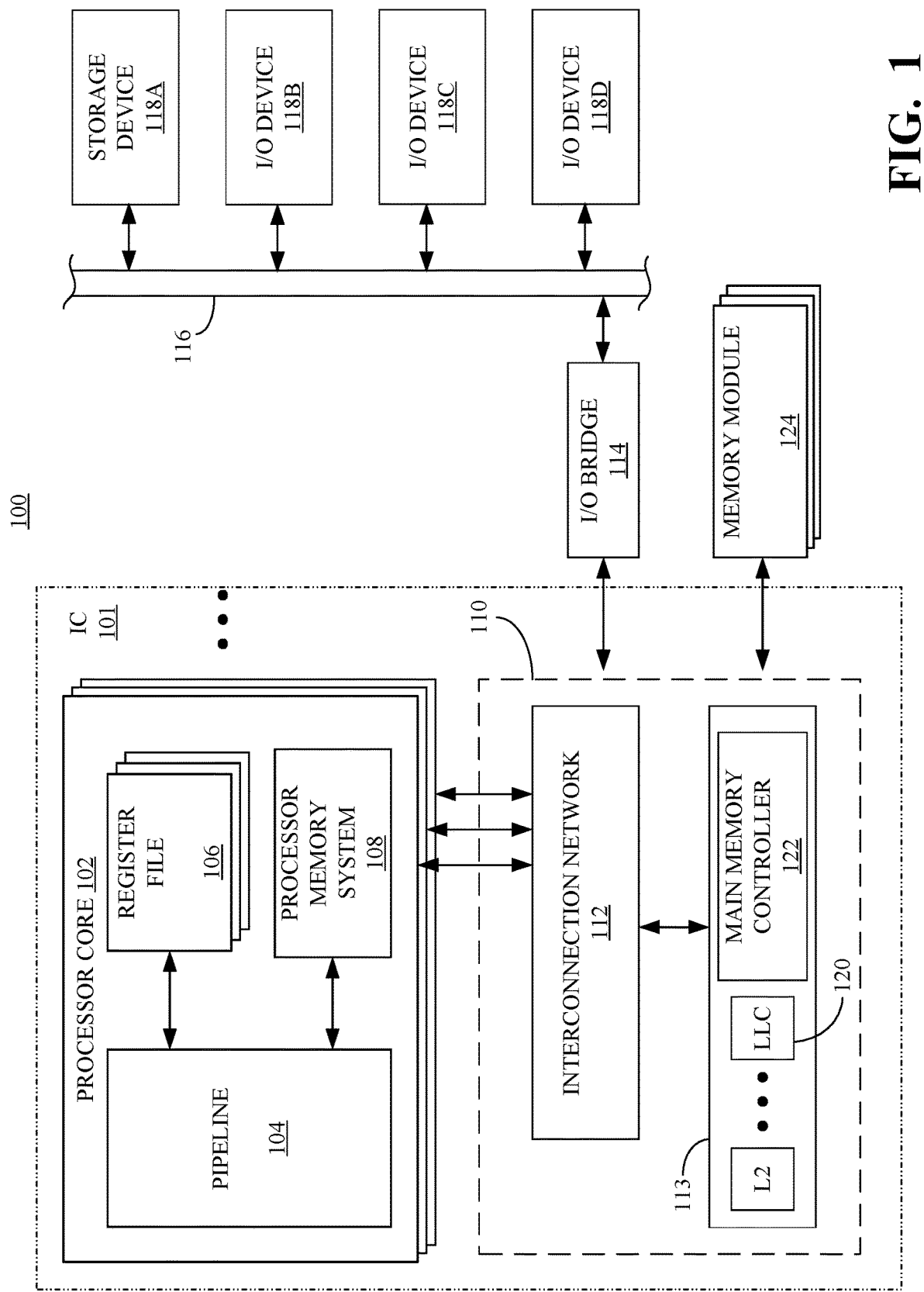
FIG. 1 is a high-level block diagram of an example of a computing system 100.

Described herein are systems and methods for side-channel attack mitigation using noisy instructions. Side-channel attacks on processors, such as portsmash, have been discovered. A side-channel attack is one in which a spy can discover information about a victim entity using knowledge of the implementation, rather than weakness in implemented algorithm itself. For example, if a spy can discover what instructions are executing on a victim process in a computer system by measuring timing information about the spy itself, then it would be considered a side-channel attack. A metric has been proposed to measure side-channel vulnerability factor (SVF) of information leakage. The basic idea is as follows. Consider a sequence of victim process operations:

A0, A1, A2, A3, . . .

And corresponding to these operations there are externally visible observations:

B0, B1, B2, B3, . . .

For example, the A operations could be instructions within a core and Bs could be observable memory channel requests. If every Ai correspond to a Bi or if a subset of Ais always correspond to a Bn, then the SVF is 100%. This says that a spy can most likely figure out what the As are by observing the Bs. In practice, there may be loose correlation between the As and Bs. Similarity matrices may be constructed to compute the SVF. A key observation is that one can infer As from Bs. For example, an SVF of zero means that there is no information leakage. So, the question arises, how can a spy be prevented from figuring out As by observing Bs.

One way to reduce the correlation and reduce the SVF is to add "noise" in the processor instruction stream. So, the same set of instructions (original algorithm) could output a different externally observable behavior every time it executes. Such a technique is proposed herein. For example, these techniques may be applied using an out-of-order processor core. For example, these techniques may be applied to an in-order processor core as well. Some implementations may use a random number generator (e.g., a true random number generator (TNRG) or a pseudorandom number generator (PNRG)).

The systems and techniques described herein may use a microarchitecture that allows for breaking up instructions into micro-operations. Most processor implementations today, such as an x86 processor, can fission a fixed set of complex instructions into two or more micro-operations. This mechanism may be extended to be able to fission any instruction into an arbitrary number of micro-operations with some max (e.g., up to 16 micro-operation). Fissioning may include two steps:

1. A decoder breaks the instruction into N micro-operations.
2. A reorder buffer at the back end of a processor pipeline needs to know how many micro-operations to expect to retire the original instruction.

Normally, the reorder buffer would have a static mapping from an instruction to a number of micro-operations that should retire in order to retire the original instruction. That mapping may change dynamically. For example, the decoder can attach this information in extra bits (e.g., 4 extra bits, assuming a maximum max 16 micro-operations per instruction) and send or otherwise associate the extra bits with each micro-operation.

Second, the systems and techniques described herein may generate (e.g., using a decoder) N micro-operations corresponding to an instruction. We call these extra micro-operations "noisy instructions." A property of these noisy instructions to facilitate easy generation may be that the result of these instructions would be thrown away. For example, the destination register of these noisy instructions may be the zero architectural register (e.g., XZR register in the ARM instruction set architecture). Writing to the zero register effectively throws the result away. Also, these noisy instructions cannot typically do loads or stores to input/output (TO) space. Memory space is typically idempotent meaning the same load can be done multiple times without having a side effect like in I/O. For example, when the decoder gets an instruction to decode, it may generate up to N (N<max) noisy instructions. The system may choose N randomly and may randomly choose a type of noisy micro-operation as well.

Generating noisy memory instructions may involve a bit more work. In some implementations, noisy memory micro-operations must ensure there is an address translation appropriate for the process from which an instruction is fissioned into the original instruction and noisy micro-operations. For example, a virtual address that is encountered by the pipeline may be recorded and sent to the decoder along with the page size. The decoder may randomly choose an address in that page. In some implementations a load may be marked special (i.e., as a noisy instruction). If a noisy load or store miss in the first level of the translation structure (e.g., L1 TLB or micro TLB), then it will simply drop.

The combination of the above two can generate enough noise in an instruction stream every time the program runs. This may degrade performance, but the primary consideration here is security.

The systems and techniques described herein may provide advantages over conventional systems and techniques, such as, for example, enough noise may be injected into side-channels to reduce the side-channel vulnerability factor (SVF) or a processor core.

Figure 2:
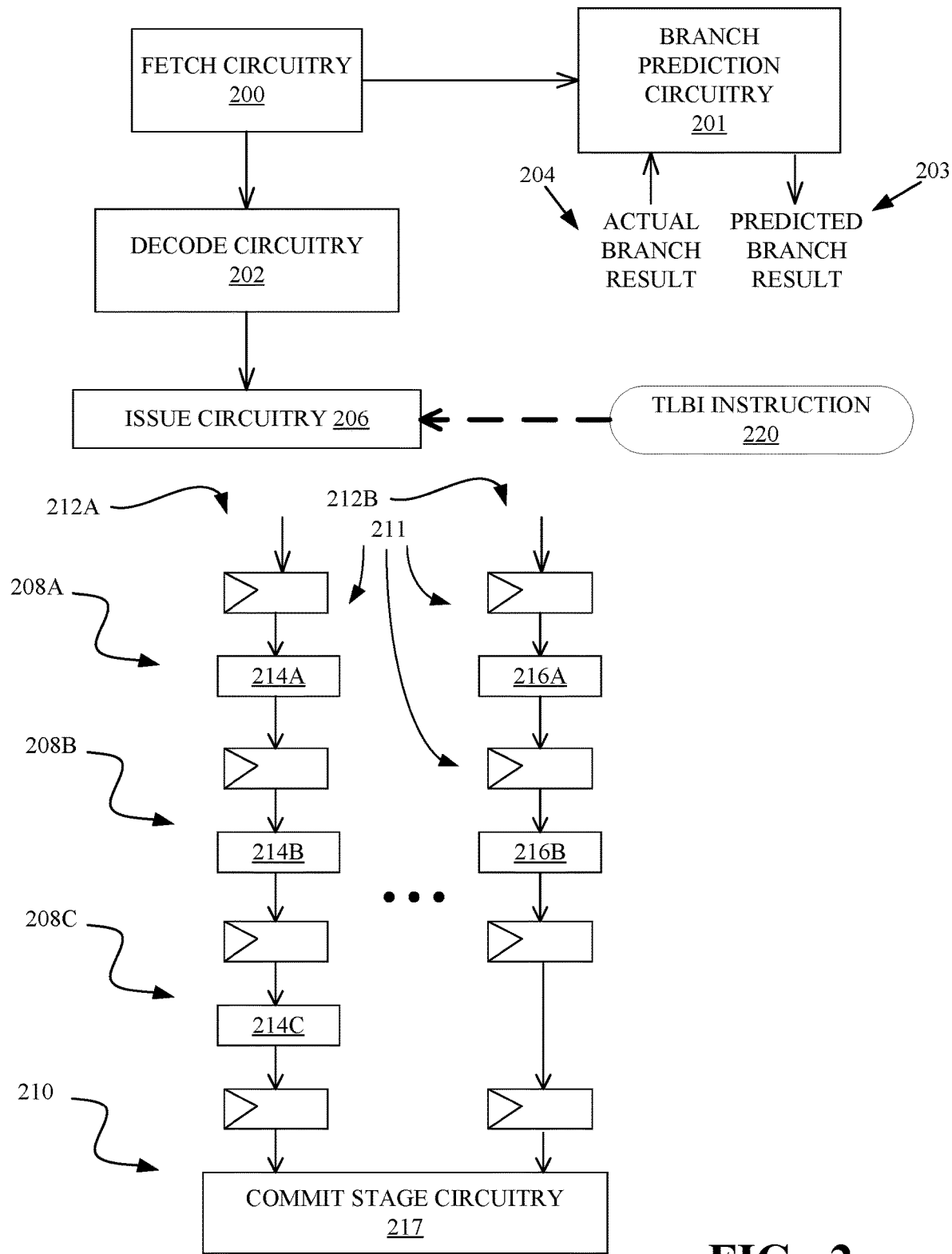
FIG. 2 is an example of a configuration of the pipeline of FIG. 1.
Figure 3:
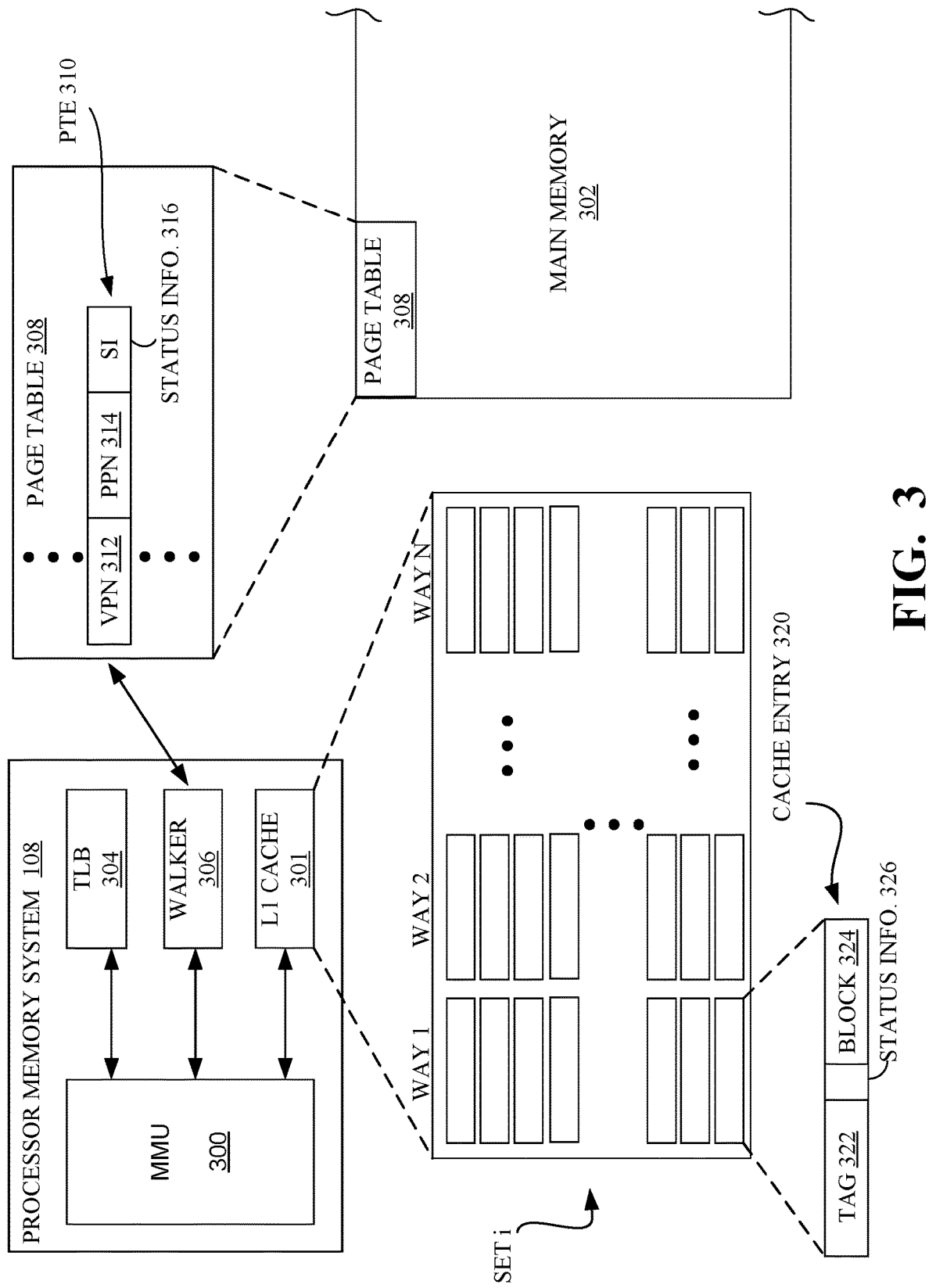
FIG. 3 is an example of a configuration of the processor memory system of FIG. 1.

Further details of techniques for side-channel attack mitigation using noisy micro-operations are described herein with initial reference to a system in which they can be implemented, as shown in FIGS. 1 through 3.

FIG. 1 is a high-level block diagram of an example of a computing system 100. The computing system 100 includes an integrated circuit 101 with at least one processor core 102, which can be a single central processing unit (CPU) or one of multiple processor cores in a multi-core architecture. In a multi-core architecture each processor core (or simply "core") can include an individual CPU with associated circuitry. In this example of a multi-core architecture, each processor core 102 can include a processor pipeline 104, one or more register files 106, and a processor memory system 108. Each register file of the register files 106 can include one or more individually addressable registers. For example, the register files 106 may include the architectural state 420 of FIG. 4. The integrated circuit 101 may be configured for mitigation of side-channel attacks using noisy micro-operations. For example, the integrated circuit 101 may be used to implement the technique 500 of FIG. 5. For example, the integrated circuit 101 may be used to implement the technique 600 of FIG. 6.

Each processor core 102 can be connected to an uncore 110. The uncore 110 can include an interconnection network 112 and an external memory system 113. The interconnection network 112 can be a bus, a cross-bar switch, a mesh network, or some other interconnection network. The interconnection network 112 can enable communication between each processor core 102 and an external memory system 113 and/or an input/output (I/O) bridge 114.

The I/O bridge 114 can enable communication, such as over an I/O bus 116, with various different I/O devices including a storage device 118A and other I/O devices 118B-118D. Non-limiting examples of the other I/O devices 118B-118D can include a network interface, a display adapter, or user input devices such as a keyboard or a mouse.

The storage device 118A can be a disk drive or some other large capacity storage device. The storage device 118A can typically be a non-volatile storage device. In some examples, the storage device 118A, or a portion thereof, can be used in a virtual memory scheme. For example, a portion of the storage device 118A can serve as secondary storage (or a 'backing store') in a virtual memory scheme for the (typically volatile and/or capacity-limited) main memory. Examples of main memory include the processor memory system 108 or an external memory system, such as described below with respect to an external memory system 113.

The processor memory system 108 and the external memory system 113 together form a hierarchical memory system. The hierarchy can include any number of levels. The levels may be denoted or referred to as L1, L2, . . . , LN. The L1 level is a lower level memory than the L2 memory system, which in turn is a lower level than the L2 memory system, and so on. Typically, each level of the hierarchical memory system can include memory (e.g., a memory system) that is slower to access than that of the immediately lower level and/or each level of the hierarchical memory system can include memory (e.g., a memory system) that is faster to access, more limited in capacity, and/or more expensive than that of a higher level. Each level of the hierarchical memory system can serve as a cache.

A first level (L1) cache can be within (e.g., a part of) the processor memory system 108. Any number of higher level (L2, L3, . . . ) caches can be within the external memory system 113. The highest (i.e., last) level cache within the external memory system 113 can be referred to as the last level cache (LLC). In an example, the LLC can be the L2 cache.

At each level, the cache can include a first module that provides an instruction cache for caching instructions and a second module that provides a data cache for caching data. The memory system of a level of the hierarchical memory system can load blocks of instructions or data into entries and evict (e.g., removes, over-writes, etc.) blocks of instructions or data from entries in units cache blocks (also called cache lines). Cache lines are further described with respect to FIG. 3.

In addition to the L1 instruction cache and data cache, the processor memory system 108 can include a translation lookaside buffer (TLB) for caching recent translations, and various other circuitry for handling a miss in the L1 instruction or data caches or in the TLB. For example, that circuitry in the processor memory system 108 of a processor core 102 can include a write buffer for temporarily holding values to be written from a store instruction being executed within the pipeline 104. The TLB is further described with respect to FIG. 3.

As already mentioned, the highest level cache within the external memory system 113 is the LLC (such as an LLC 120). The LLC 120 can be accessed (e.g., searched, etc.) just before main memory. Of course, this is only an example. The exact division between which level caches are within the processor memory system 108 and which are in the external memory system 113 can be different in other examples. For example, the L1 cache and the L2 cache can both be internal to the processor core 102 (i.e., part of the processor memory system 108) and the L3 (and higher) caches can be external to the processor core 102.

In an example, each processor core 102 can have its own internal L1 cache, and the processor cores can share an L2 cache. The external memory system 113 can also include a main memory controller 122. The main memory controller 122 can be connected to any number of memory modules 124. Each of the memory modules 124 can serve as (e.g., can be) the main memory. In a non-limiting example, one or more of the memory modules 124 can be Dynamic Random Access Memory (DRAM) modules.

In a typical example, the content of a memory address is searched for in a level (e.g., L1) of the hierarchical memory system. If not found, then the next higher level (e.g., L2) is searched; and so on. Searching for a memory address amounts to answering the question: does this memory level of the hierarchical memory system include the content of the memory address? Or, alternatively, is the memory address cached in this memory of the hierarchical memory system?

That is, in a particular cache level of the hierarchy of the hierarchical memory system, each cache entry includes space for storing the data words of a particular memory block along with bits for determining whether a particular word from a memory block is present in that cache level (i.e., a 'hit') or not present in that cache level (i.e., a 'miss'). After a miss in one level, the cache system attempts to access (i.e., read or write) the memory block from a higher level cache, or from the main memory (in the case of a miss in the LLC).

The pipeline 104 can include multiple stages through which instructions advance, a cycle at a time. The stages can include an instruction fetch (IF) stage or stages, an instruction decode (ID) stage or stages, an operand fetch (OF) stage or stages, an instruction execution (IE) stage or stages, and/or a write back (WB) stage or stages. The pipeline can include other stages, as further described with respect to FIG. 2. Some stages occur in a front-end portion of the pipeline. Some other stages occur in a back-end portion of the pipeline. The front-end portion can include pre-execution stages. The back-end portion of the pipeline can include execution and post-execution stages. The pipeline 104 is further described with respect to FIG. 2.

First, an instruction is fetched (e.g., in the IF stage or stages). An instruction can be fetched based on a program counter (PC). The PC is a pointer that can be used to identify instructions within memory (e.g., within a portion of the main memory, or within an instruction cache of the core 102). The PC can advance through addresses of a block of compiled instructions (called a "basic block"). The PC can be incremented by a particular number of bytes. The particular number of bytes for incrementing the PC can depend on how long (e.g., in bytes) each instruction is and on how many instructions are fetched at a time.

After being fetched, the instruction is then decoded (e.g., in the ID stage or stages) to determine an operation and one or more operands. Alternatively, in some pipelines, the IF and ID stages can overlap. If the instruction includes operands, the operands are fetched (e.g., in the OF stage or stages).

The instruction is then ready to be issued. Issuing an instruction starts progression of the instruction through stages in a back-end portion of the pipeline to execute the instruction. In an example, execution of the instruction can involve applying the operation of the instruction to the operand(s) to produce a result for an arithmetic logic unit (ALU) instruction. In an example, execution of the instruction can involve storing or loading to or from a memory address for a memory instruction. In an example, execution of the instruction can involve evaluating a condition of a conditional branch instruction to determine whether or not the branch should be taken.

After an instruction has completed execution, the instruction can be committed so that any effect of the instruction is made globally visible to software. Committing an instruction may involve storing a result in a register file (e.g., in the WB stage or stages), for example. In most implementations, even if any instructions were issued out-of-order, all instructions are generally committed in-order.

FIG. 2 is an example of a configuration of the pipeline 104 of FIG. 1.

The pipeline 104 can include circuitry for the various stages (e.g., the IF, ID, and OF stages). For one or more instruction fetch stages, an instruction fetch circuitry 200 provides a PC to an instruction cache in a processor memory system, such as the processor memory system 108 of FIG. 1, to fetch (e.g., retrieve, read, etc.) instructions to be fed (e.g., provided to, etc.) into the pipeline 104. For example, the PC can be a virtual address of the next instruction, in which case the PC can be incremented by the length of a virtual address in the case of sequential execution (i.e., without taking any branches). Virtual addresses are described with respect to FIG. 3.

The instruction fetch circuitry 200 can also provide the program counter, PC, to a branch prediction circuitry 201. The branch prediction circuitry 201 can be used to provide a predicted branch result 203 for branch instructions. The predicted branch result 203 enables the pipeline 104 to continue executing speculatively while an actual branch result 204 is being determined. The branch prediction circuitry 201 can also store branch history information that is updated based on receiving the actual branch result 204. In some implementations, some or all of the branch prediction circuitry 201 can be considered to be a part of the instruction fetch circuitry 200.

In an the out-of-order execution, for one or more instruction decode (ID) stages, instruction decode circuitry 202 can store information in an issue queue for instructions in an instruction window waiting to be issued. The issue queue (which can also be referred to as an instruction queue) is such that an instruction in the queue can leave the queue when the operands of the instruction become available. As such, the instruction can leave before earlier (e.g., older) instructions in a program being executed. The instruction window refers to a set of instructions that can execute out-of-order.

An issue circuitry 206 can determine a respective cycle in which each of the instructions in the issue queue are to be issued. Issuing an instruction makes the instruction available to progress through circuitry of instruction execution (IE) stages, such as a first execution stage 208A, a second execution stage 208B, and a third execution stage 208C, of the pipeline 104. For simplicity of explanation, only three execution stages are illustrated in FIG. 2. However, the disclosure herein is not so limited: more or fewer execution stages are possible.

The pipeline 104 can include one more commit stages, such as a commit stage 210. A commit stage commits (e.g., writes to memory) results of instructions that have made their way through the IE states 208A, 208B, and 208C. For example, a commit stage circuitry 217 may write back a result into a register file, such as the register file 106 of FIG. 1. However, some instructions may not be committed by the commit stage circuitry 217; Instead the results of the instructions may be committed by other circuitry, such as circuitry in another stage of the back-end or a stage of the front-end, possibly based on information from the commit stage.

Between adjacent stages of the pipeline 104, the various paths through the pipeline circuitry include pipeline registers. For example, shown in FIG. 2 are pipeline registers 211 for the IE stages 208A, 208B, and 208C. The pipeline registers can be used for storing results of an upstream stage to be passed downstream to a next stage. The pipeline registers 211 may be clocked by (i.e., receive a clock signal derived from) a common clock (not shown). Thus, each clock cycle, each pipeline register 211 (also called a latch, or a set of flip-flops) can pass a result from its input to its output and becomes ready to receive a new result in its input after that result has been produced by the circuitry of that stage.

There may be multiple separate paths through the IE stages. The IE stages can include various circuitry for executing different types of instructions. For illustration purposes, only two paths 208A and 208B are shown in FIG. 2. However, the execution stages can include any number of paths with corresponding circuitry, which can be separated by pipeline registers, such as the pipeline registers 211.

The number of paths through the instruction execution stages can generally be dependent on the specific architecture. In an example, enough paths can be included such that a number of instructions up to a maximum number of instructions that can progress through the same execution stages in the same cycles. The maximum number of instructions that can progress through the same execution stages in the same cycles can be referred to as the issue width.

The number of stages that include functional circuitry for a given path may also differ. In the example of FIG. 2, a first path 212A includes functional circuitry 214A, 214B, and 214C located in the first execution stage 208A, the second execution stage 208B, and the third execution stage 208C, respectively. The second path 212B includes functional circuitry 216A and 216B located in the first execution stage 208A and the second execution stage 208B, respectively. In the second path 212B, the third execution stage 208C is a "silo stage" that passes a result along without performing further computation thereby ensuring that each path passes through the same number of stages through the pipeline.

In an example, a path can include circuitry for executing instructions using units for various operations (e.g., ALU, multiplier, floating point unit, etc.). In an example, another path can include circuitry for executing memory access instructions. The memory access instructions can include load instructions that read data values from the memory system. The memory access instructions can include store instructions to write data values to the memory system. The circuitry for executing memory access instructions can also initiate translation of virtual addresses to physical addresses, when necessary, as described in more detail below with respect to FIG. 3.

In addition to branch prediction, as described with respect to the branch prediction circuitry 201, the pipeline 104 can be configured to perform other types of speculative execution. In an example of another type of speculative execution, the pipeline 104 can be configured to reduce the chance of stalling (such as in the event of a cache miss) by prefetching. Stalling refers to the situation in which processor execution of instructions is stopped/paused.

A prefetch request can be used to preload a cache level (e.g., of a data cache) so that a future memory request is likely to hit in that cache level instead of having to access a higher cache level or a main memory. For example, a speculative memory access request can include prefetch requests that are sent to preload an instruction cache or data cache based on a predicted access pattern.

A prefetch request can be or can include a software prefetch request such that an explicit prefetch instruction that is inserted into the pipeline 104 includes a particular address to be prefetched. A prefetch request can be or can include a hardware prefetch that is performed by hardware within the processor (e.g., the processor core 102) without an explicit prefetch instruction being inserted into its pipeline (e.g., the pipeline 104).

In some cases, prefetching can include recognizing a pattern (e.g., a stream) within the memory accesses of a program, or can include speculatively performing a load instruction within a program (e.g., using a speculative address for that load instruction) before that load instruction is actually issued as part of program execution.

Various types of external instructions can be received from other processor cores. Such externally received instructions can be inserted into the pipeline 104 by the issue circuitry 206 to be handled at the appropriate stage. An example of such an externally received instruction is a TLB invalidation (TLBI) instruction 220 for invalidating entries in the TLB of that particular processor core (i.e., the receiving core). Another example of an external instruction that can be received is a GlobalSync instruction, which may be broadcast to processor cores as a side effect of a memory barrier operation performed by a processor core to ensure that the effects of any previously broadcast TLBIs have been completed. Said another way, an originating processor core that issues a broadcast TLBI instruction can subsequently issue a data synchronization barrier (DSB) instruction, which in turn causes GlobalSync instructions to be received by every other processor core. In response to the GlobalSync instruction, when a receiving processor core completes the TLBI instruction, the receiving processor core sends, or causes to be sent, an acknowledgement to the originating process core. Once the originating process core receives acknowledgements from all receiving processor cores, the originating process core can proceed with instruction execution.

FIG. 3 is an example of a configuration of the processor memory system 108 of FIG. 1. In example illustrated in FIG. 3, the processor memory system 108 includes a memory management unit (MMU) 300 that manages access to the memory system. The MMU 300 can manage the translation of virtual addresses to physical addresses.

In some implementations, the MMU 300 can determine whether a copy of a stored value (e.g., data or an instruction) at a given virtual address is present in any of the levels of the hierarchical cache system, such as in any of the levels from an L1 cache 301 up to the LLC 120 (FIG. 1) if necessary. If so, then the instruction accessing that virtual address can be executed using a cached copy of the value associated with that address. If not, then that instruction can be handled by miss circuitry to be executed after accessing the value from a main memory 302.

The main memory 302, and potentially one or more levels of the cache system, may need to be accessed using a physical address (PA) translated from the virtual address (VA). To this end, the processor memory system 108 can include a TLB 304 that stores translations, defined by VA-to-PA mappings, and a page table walker 306 for accessing a page table 308 if a translation is not found in the TLB 304. The translations stored in the TLB can include recently accessed translations, likely to be accessed translations, some other types of translations, or a combination thereof.

The page table 308 can store entries, including a page table entry (PTE) 310, that contain all of the VA-to-PA mappings currently in use. The page table 308 can typically be stored in the main memory 302 along with physical memory pages that represent corresponding mapped virtual memory pages that have been "paged in" from secondary storage (e.g., the storage device 118A of FIG. 1).

A memory page can include a number of cache blocks. A cache block can include a number of words. A word is of a predetermined number (e.g., 2) of bytes. A byte is a group of bits (e.g., 8 bits), which can be operated on as a unit. A byte can be considered a unit of memory size.

Alternatively, in a virtualized system with one or more guest operating systems managed by a hypervisor, virtual addresses (VAs) may be translated to intermediate physical addresses (IPAs), which are then translated to physical addresses (PAs). In a virtualized system, the translation by a guest operating system of VAs to IPAs may be handled entirely in software, or the guest operating system may have some hardware assistance from the MMU 300.

The TLB 304 can be used for caching recently accessed PTEs from the page table 308. The caching of recently accessed PTEs can enable the translation to be performed (such as in response to a load or a store instruction) without the page table walker 306 having to perform a potentially multi-level page table walk of a multiple-level data structure storing the page table 308 to retrieve the PTE 310. In an example, the PTE 310 of the page table 308 can store a virtual page number 312 and a physical page number 314, which together serve as a mapping between a VA and a PA that defines a translation of that VA.

An address (i.e., a memory address) can be a collection of bits. The bits of the memory address can be divided into low-order bits and high-order bits. For example, assuming 32-bit addresses, an example of a memory address is 01101001 00101000 00001101 01011100. The low-order bits are the rightmost 16 bits (i.e., 00001101 01011100); and the high-order bit are the leftmost 16 bits (i.e., 01101001 00101000). The low-order bits of a memory address can be used as a page offset. The low-order bits can be identical for a VA and its mapped PA. Thus, the high-order bits of a memory address can be used as a memory page number to specify the mapping.

The PTE 310 can also include status information (SI) 316. The SI 316 can indicate whether or not the page is resident in the main memory 302 or whether the page should be retrieved from secondary storage. When the PTE 310 is stored in an entry of any of the TLB 304, there may also be additional information for managing the transfer of PTEs between the page table 308 and the TLB 304, and for invalidating PTEs in the TLB 304. In an example, invalidating PTEs in the TLB 304 can be accomplished by toggling a bit (that indicates whether the entry is valid or not) to a state (i.e., a binary state) that indicates that the entry is invalid. However, other ways of invalidating PTEs are possible.

If a valid entry in the TLB 304 that matches with a portion of a VA to be translated is found (i.e., a "TLB hit"), then the PTE stored in that entry is used for translation. If there is no match (i.e., a "TLB miss"), then the page table walker 306 can traverse (or "walk") the levels of the page table 308 retrieve a PTE.

The L1 cache 301 can be implemented in any number of possible ways. In the implementation illustrated in FIG. 3, the L1 cache 301 is illustrated as being implemented as an N-way set associative cache module. Each cache entry 320 of the L1 cache 301 can include bits for storing a particular cache block 324 that has been copied from a physical page in the main memory 302 (possibly via higher level cache module).

The cache entry 320 can also include bits for storing a tag 322. The tag 322 can be made up of a number of the most significant bits of a virtual address, which are common to the words of that entry. For a virtually indexed, virtually tagged (VIVT) type of cache module, in addition to comparing a tag portion of a virtual address of desired data, the cache module can compare an index portion of the virtual address (which can be made up of middle bits between the tag and a block offset) to determine which of multiple sets may have a cache entry containing those desired data.

For an N-way set associative cache, the tag comparison can be performed N times (possibly in parallel) for the selected "set" (i). The comparison can be performed once for each of N "ways" in which a cache block containing the desired data may be stored.

The block offset can then be used to select a particular word from a cache block that is found in the cache entry (i.e., a 'cache hit'). If the tag does not match for any of the ways of the selected set (i.e., a 'cache miss'), then the cache system can attempt to retrieve the cache block from a higher level cache or from the main memory 302 (in the case of the LLC). The cache entry 320 can also include bits for storing status information 326. The status information 326 can include, for example, a valid bit and/or any flags or error correction bits.

When establishing a translation from a particular virtual address to a particular physical address or to an intermediate physical address, various types of context information can be used to distinguish otherwise identical virtual addresses from each other. The context information can enable multiple independent virtual address spaces to exist for different processes or different virtual machines or any of a variety of other differentiating characteristics that support different virtual address spaces.

Various portions of the context information can be used for differentiating between virtual addresses that are in use within different VA-to-PA translations, or in the case that intermediate physical addresses (IPAs) are used, VA-to-IPA translations, or IPA-to-PA translations.

For example, an operating system can use an address space identifier (ASID) (e.g., 16 bits) to identify a memory space (a virtual address space) associated with a running process. A hypervisor can use a virtual machine identifier (VMID) (e.g., 16 bits) to identify a memory space (i.e., an intermediate physical address space) associated with a guest operating system of a virtual machine.

Certain parameters can be associated with different classes of processes or software environments that are available in an architecture, such as a security state with values of secure (S) or non-secure (NS), or an exception level (also called a 'priority level') with values of EL0-EL3 (for a 2-bit exception level), for example.

All or a subset of this context information together constitute a context (also called a "translation context" or a "software context") for a particular virtual address.

A context identifier (CID) can represent either the full context information or partial context information. In some architectures, for example, the full context information can include 35 bits: a 2-bit exception level (EL), a 1-bit non-secure/secure (NS/S) value, a 16-bit VMID, and a 16-bit ASID.

It is to be noted, though, that there can potentially be significant overhead in terms of integrated circuit area devoted to the storage for the data structure that tracks validity for different CIDs. To reduce the overhead, the CID can include partial context information, such as only the 16-bit VMID and the 2-bit EL. Such partial context information can uniquely identify different subsets of contexts. Alternatively, instead of simply concatenating subsets of bits from the full context information, techniques can be used to essentially compress full context information into fewer bits. For example, circuitry that computes the CIDs can be configured to include fewer bits than the full context information, where those bits can be assigned based on a stored mapping between CIDs and a corresponding full context information string.

While the mapping itself takes space on the integrated circuit, more space can be saved in the data structure that tracks validity of different active CIDs. Additional details about techniques for compressing context information can be found, for example, in U.S. Pat. No. 9,779,028, entitled "MANAGING TRANSLATION INVALIDATION," which is incorporated herein by reference.

Figure 4:
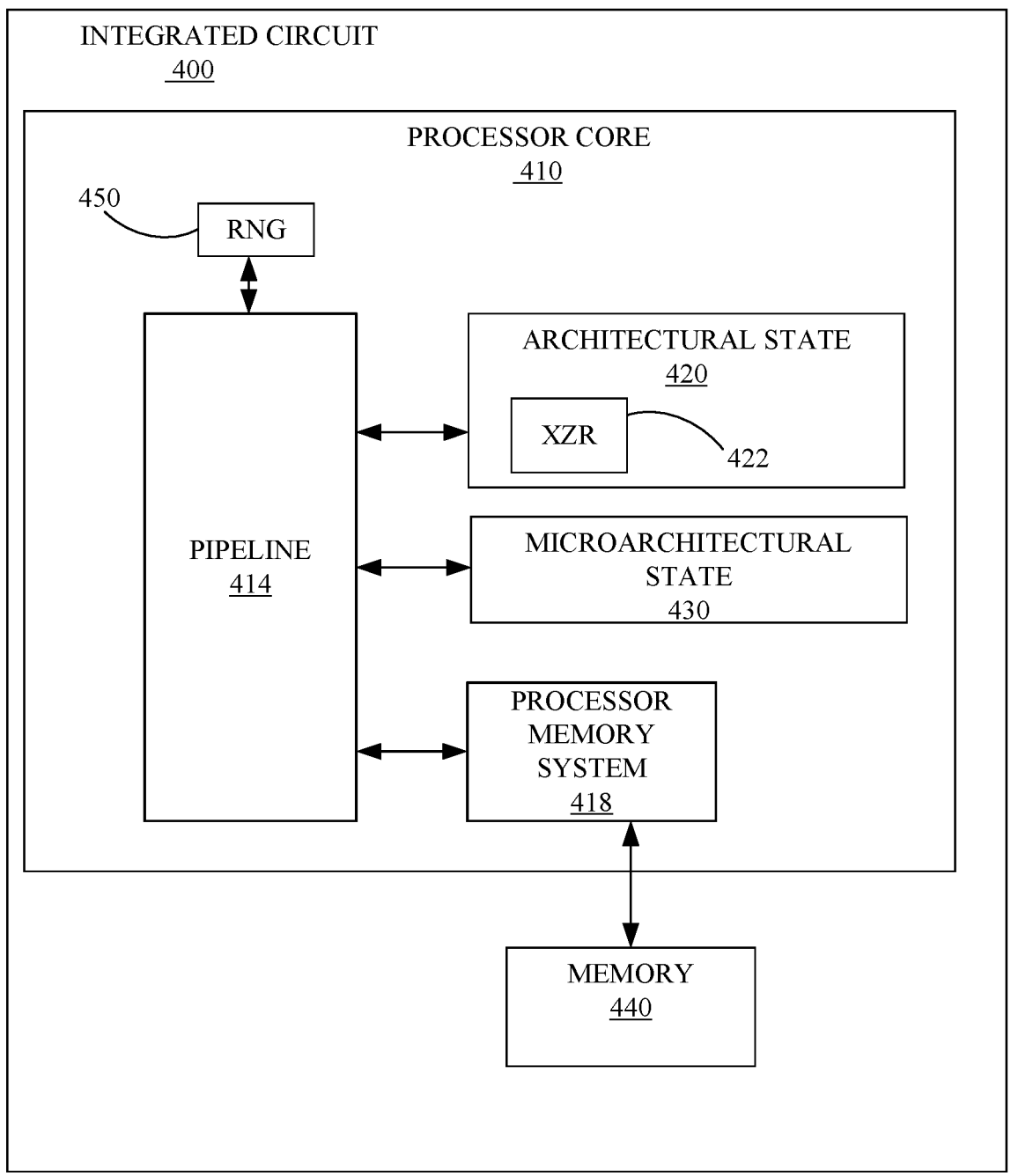
FIG. 4 is a block diagram of an example of an integrated circuit for executing instructions with side-channel attack mitigation using noisy instructions.

FIG. 4 is a block diagram of an example of an integrated circuit 400 for executing instructions with side-channel attack mitigation using noisy instructions. The integrated circuit 400 includes a processor core 410 including the processor pipeline 414, the processor memory system 418, an architectural state 420, and a microarchitectural state 430. The integrated circuit 400 includes a memory 440 configured to store instructions. The integrated circuit 400 includes a random number generator 450. The integrated circuit 400 may be configured to fetch an instruction from the memory 440 into the processor pipeline 414; and fission the instruction into a set of micro-operations that includes one or more micro-operations that perform the instruction and the random number of noisy micro-operations and/or a randomly selected noisy instruction, which may introduce noise in side-channels of the processor core 410 to mitigate side-channel attacks on processes running on the processor core 410. For example, the integrated circuit 400 may be used to implement the technique 500 of FIG. 5. For example, the integrated circuit 400 may be used to implement the technique 600 of FIG. 6.

The integrated circuit 400 includes a processor core 410 including a processor pipeline 414 that is configured to execute instructions using an architectural state 420 of the processor core 410. For example, the processor pipeline 414 may be the processor pipeline 104 of FIG. 2. For example, the processor pipeline 414 may be configured to execute instructions of an instruction set architecture, such as an Advanced RISC Machine (ARM) instruction set architecture or an x86 instruction set architecture. The processor core 410 stores the architectural state 420 associated with its instruction set architecture. In this example, the architectural state 420 includes a zero register 422. The zero register 422 always returns the value of zero when read and writing to the zero register 422 does not change zero register 422. The processor core 410 also stores a microarchitectural state 430 that includes internal data of the processor core 410 that is not directly accessible by software running on the processor core 410.

The integrated circuit 400 includes a memory 440 (e.g., a random access memory (RAM)) configured to store instructions. The memory 440 is may also be configured to store other data. The memory 440 may include many data storage circuitries that can be accessed using an addressing scheme. The processor core 410 may access instructions and other data stored in the memory 440 using its processor memory system 418. In some implementations, the processor memory system 418 includes an L1 instruction cache of the processor core 410. For example, the processor memory system 418 may be the processor memory system 108 of FIG. 3. In this example, the memory 440 is included in the integrated circuit 400, but in some implementations, the instructions may be stored in a memory external to the integrated circuit 400.

The integrated circuit 400 includes a random number generator 450. For example, the random number generator 450 may be a true random number generator (TRNG). For example, the random number generator 450 may be used to generate a random number based on thermal noise.

For example, the integrated circuit 400 may be configured to fetch an instruction from the memory 440 into the processor pipeline 414; generate a random number; fission the instruction into a set of micro-operations that includes one or more micro-operations that perform the instruction and the random number of noisy micro-operations, wherein each of the noisy micro-operations does not affect the architectural state 420; execute the set of micro-operations using one or more execution units of the processor pipeline 414; and retire, responsive to completion of execution of the set of micro-operations, the instruction. In some implementations, the integrated circuit 400 is configured to randomly select an instruction type of one of the random number of noisy micro-operations from among a set of types of available noisy micro-operations. In some implementations, the integrated circuit 400 is configured to randomly select an address used by one of the random number of noisy micro-operations from among a memory address space. For example, the memory address space may be a page of memory that has been accessed by a process that includes the instruction. For example, one of the random number of noisy micro-operations may have the zero register 422 of the architectural state 420 as a destination register. For example, one of the random number of noisy micro-operations is a load micro-operation. In some implementations, the integrated circuit 400 is configured to mark as noisy one of the random number of noisy micro-operations to prevent a cache entry from being updated in response to a cache miss caused by the marked noisy micro-operation. For example, the integrated circuit 400 may implement the technique 700 of FIG. 7.

For example, the integrated circuit 400 may be configured to: fetch an instruction from the memory 440 into the processor pipeline 414; randomly select an instruction type from among a set of types of available noisy micro-operations; fission the instruction into a set of micro-operations that includes one or more micro-operations that perform the instruction and a noisy micro-operation of the selected instruction type, wherein the noisy micro-operations does not affect the architectural state 420; execute the set of micro-operations using one or more execution units of the processor pipeline 414; and, retire, responsive to completion of execution of the set of micro-operations, the instruction.

Figure 5:
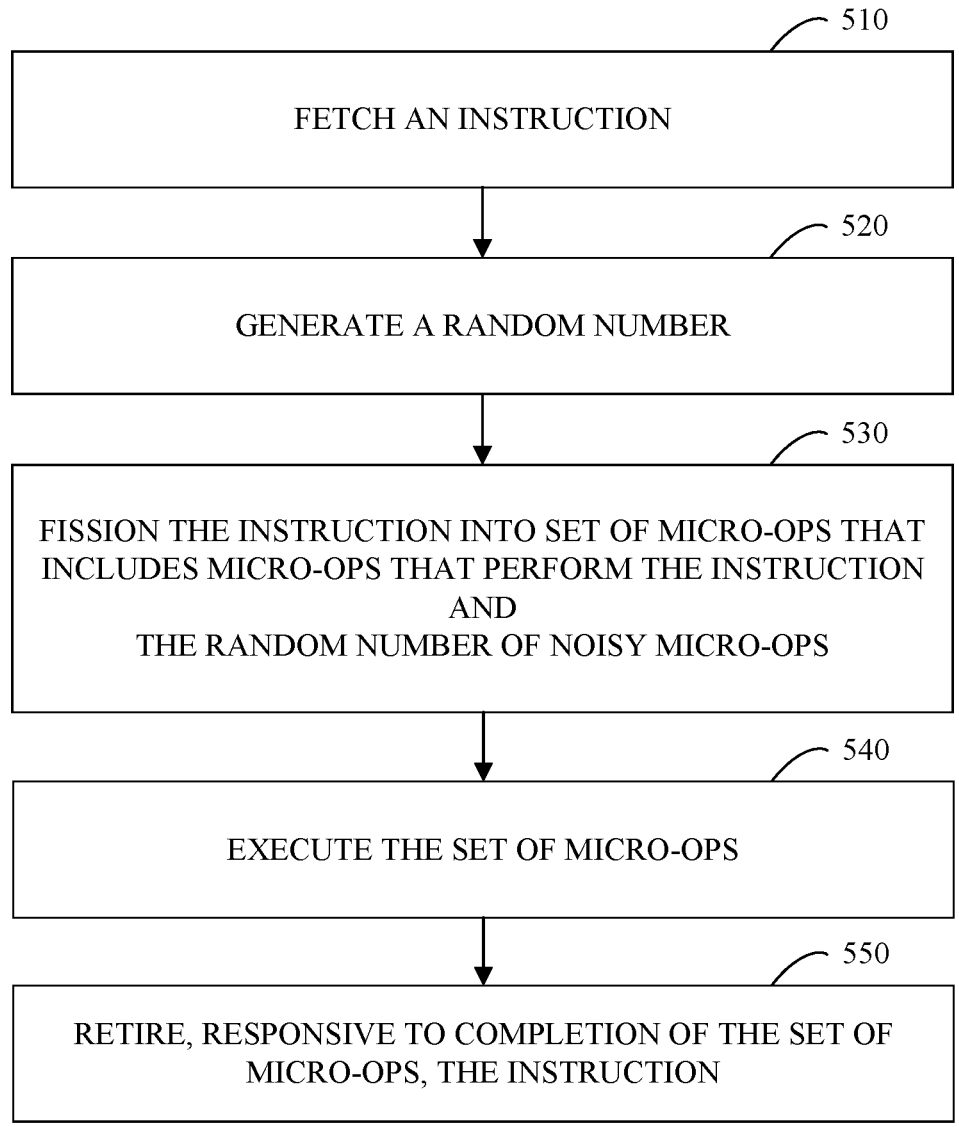
FIG. 5 is a flow chart of an example of a technique for side-channel attack mitigation using random numbers of noisy instructions.

FIG. 5 is a flow chart of an example of a technique 500 for side-channel attack mitigation using random numbers of noisy instructions. The technique 500 includes fetching 510 an instruction from a memory into a processor pipeline of a processor core; generating 520 a random number; fissioning 530 the instruction into a set of micro-operations that includes one or more micro-operations that perform the instruction and the random number of noisy micro-operations; executing 540 the set of micro-operations using one or more execution units of the processor pipeline; and, retiring 550, responsive to completion of execution of the set of micro-operations, the instruction. For example, the technique 500 may be implemented using the integrated circuit 101 of FIG. 1. For example, the technique 500 may be implemented using the integrated circuit 400 of FIG. 4.

The technique 500 includes fetching 510 an instruction from a memory (e.g., via the processor memory system 108) into a processor pipeline (e.g., the processor pipeline 104) of a processor core that is configured to execute instructions using an architectural state (e.g., the architectural state 420) of the processor core. For example, the instruction may be an instruction of an instruction set architecture (e.g., an ARM instruction set or an x86 instruction set). For example, the instruction may be fetched via a cache (e.g., the L1 cache 301).

For example, the technique 500 may include detecting that the instruction has been designated as a sensitive instruction, and adding noisy micro-operations only to sensitive instructions. In some implementations, sensitive instructions may be statically designated (e.g., a certain type of instruction is always considered sensitive). For example, the sensitive instruction may be detected based on an opcode of the instruction. In some implementations, sensitive instructions may be dynamically designated (e.g., an instruction may be marked as sensitive by software using a flag). For example, the sensitive instruction may be detected based on a flag included in the instruction (e.g., a sensitive bit). For example, the sensitive instruction may be detected based on a flag in an architectural register. A variety of different instructions may be considered as sensitive, depending on the applications being executed. For example, the sensitive instruction may be a cryptographic instruction. For example, the sensitive instruction may be an AES single round decryption instruction. For example, the sensitive instruction may be an AES single round encryption instruction.

The technique 500 includes generating 520 a random number. For example, the random number may be in integer selected from a range of allowed numbers of noisy micro-operations to be added to the fissioned 530 instruction. For example, the random number may be selected from the range zero to a maximum number of micro-operations (e.g., 8 or 16) per instruction minus the number of micro-operations needed to perform the instruction. A random number generator (e.g., the random number generator 450) may be used to generate the random number. In some implementations, the random number is generated 520 using a pseudo-random number generator.

The technique 500 includes fissioning 530 the instruction into a set of micro-operations that includes one or more micro-operations that perform the instruction and the random number of noisy micro-operations. Each of the noisy micro-operations does not affect the architectural state (e.g., the architectural state 420). For example, one of the random number of noisy micro-operations may have a zero register (e.g., the zero register 422) of the architectural state as a destination register. For example, one of the random number of noisy micro-operations may be a load micro-operation, which may have the zero register as its destination register. The noisy micro-operations may alter a microarchitectural state (e.g., the microarchitectural state 430). Thus, the noisy micro-operations may impact side-channels without changing the final outputs determined by a process that includes the instruction. By randomly choosing the number of noisy micro-operations to inject during fissioning 530 of the instruction, side-channel signals that might otherwise be exploited in a side-channel attack may be obscured and the side-channel vulnerability factor (SVF) of the processor core may be reduced. In some implementations, one of the random number of noisy micro-operations are marked as noisy to prevent a cache entry from being updated in response to a cache miss caused by the marked noisy micro-operation. For example, the technique 700 of FIG. 7 may be implemented to prevent certain cache updates.

Additional randomness may be introduced in the noisy micro-operations. In some implementations, fissioning 530 the instruction includes randomly selecting an instruction type of one of the random number of noisy micro-operations from among a set of types of available noisy micro-operations. For example, the set of types of available noisy micro-instructions may include load instructions to read data from memory, micro-operations that use an arithmetic logic unit (ALU), micro-operations that use a floating point unit (FPU), and/or cryptographic microoperations. In some implementations, fissioning 530 the instruction includes randomly selecting an address used by one of the random number of noisy micro-operations from among a memory address space. For example, the memory address space may be a page of memory that has been accessed by a process that includes the instruction.

The technique 500 includes executing 540 the set of micro-operations using one or more execution units of the processor pipeline (e.g., the processor pipeline 104). The set of micro-operations, including the random number of noisy micro-operations, may be executed using multiple different execution units (e.g., ALUs, FPUs, cryptographic units, and/or load/store units). For example, using multiple execution units during a period corresponding to execution of the instruction may serve to mitigate portsmash attacks.

The technique 500 includes retiring 550, responsive to completion of execution of the set of micro-operations, the instruction. For example, a reorder buffer may detect a dynamic mapping from the instruction to the random number of micro-operations that will be retired to retire the instruction. In some implementations, a decoder (e.g., the decode circuitry 201) of the processor pipeline can attach this information in extra bits (e.g., 4 extra bits assuming a maximum of 16 micro-ops per instruction) and send them with each micro-operation. The extra bits capture how many micro-operations need to be retired in order to retire the full instruction.

Figure 6:
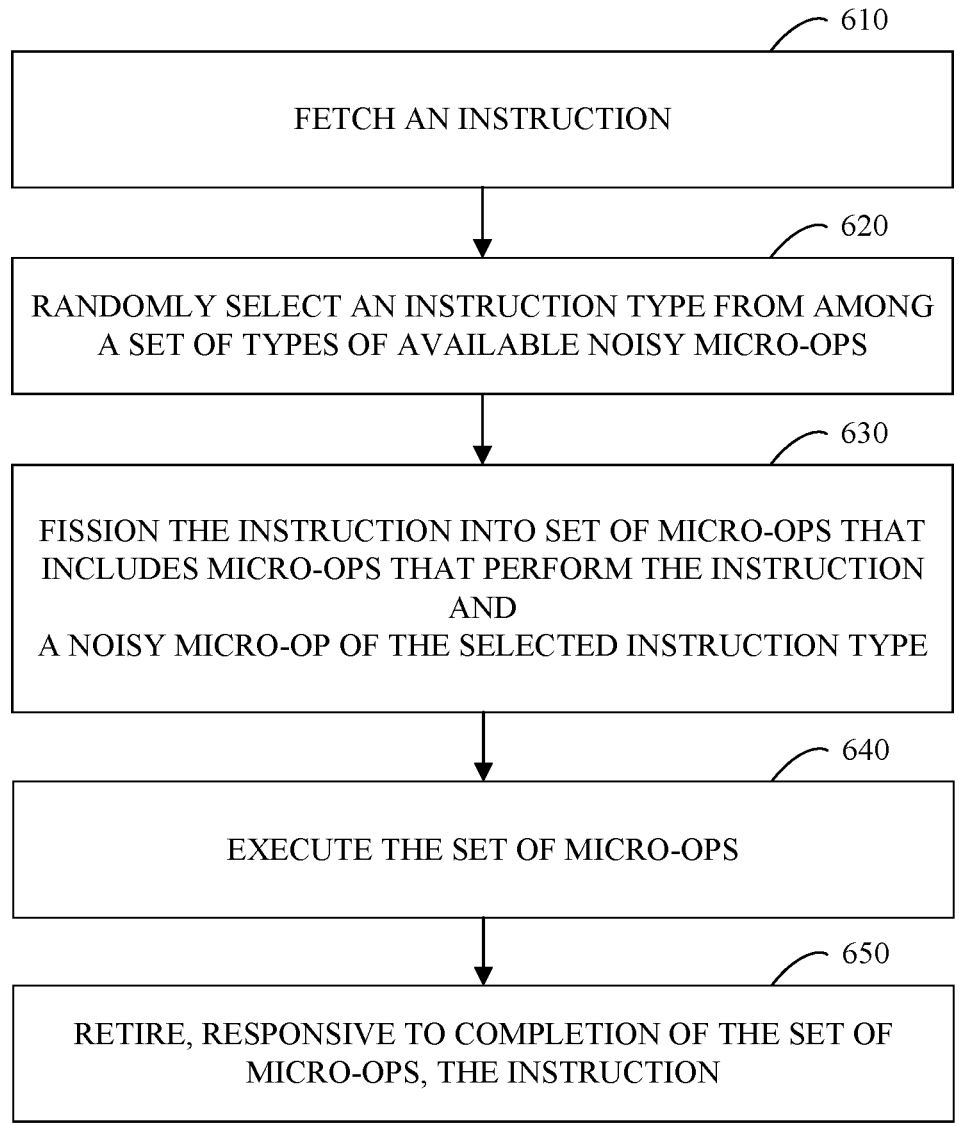
FIG. 6 is a flow chart of an example of a technique for side-channel attack mitigation using a randomly selected noisy instruction.

FIG. 6 is a flow chart of an example of a technique 600 for side-channel attack mitigation using a randomly selected noisy instruction. The technique 600 includes fetching 610 an instruction from a memory into a processor pipeline; randomly selecting 620 an instruction type from among a set of types of available noisy micro-operations; fissioning 630 the instruction into a set of micro-operations that includes one or more micro-operations that perform the instruction and a noisy micro-operation of the selected instruction type; executing 640 the set of micro-operations using one or more execution units of the processor pipeline; and, retiring 650, responsive to completion of execution of the set of micro-operations, the instruction. For example, the technique 600 may be implemented using the integrated circuit 101 of FIG. 1. For example, the technique 600 may be implemented using the integrated circuit 400 of FIG. 4.

The technique 600 includes fetching 610 an instruction from a memory (e.g., via the processor memory system 108) into a processor pipeline (e.g., the processor pipeline 104) of a processor core that is configured to execute instructions using an architectural state (e.g., the architectural state 420) of the processor core. For example, the instruction may be an instruction of an instruction set architecture (e.g., an ARM instruction set or an x86 instruction set). For example, the instruction may be fetched via a cache (e.g., the L1 cache 301).

For example, the technique 600 may include detecting that the instruction has been designated as a sensitive instruction, and adding noisy micro-operations only to sensitive instructions. In some implementations, sensitive instructions may be statically designated (e.g., a certain type of instruction is always considered sensitive). For example, the sensitive instruction may be detected based on an opcode of the instruction. In some implementations, sensitive instructions may be dynamically designated (e.g., an instruction may be marked as sensitive by software using a flag).

For example, the sensitive instruction may be detected based on a flag included in the instruction (e.g., a sensitive bit). For example, the sensitive instruction may be detected based on a flag in an architectural register. A variety of different instructions may be considered as sensitive, depending on the applications being executed. For example, the sensitive instruction may be a cryptographic instruction. For example, the sensitive instruction may be an AES single round decryption instruction. For example, the sensitive instruction may be an AES single round encryption instruction.

The technique 600 includes randomly selecting 620 an instruction type from among a set of types of available noisy micro-operations. For example, the set of types of available noisy micro-instructions may include load instructions to read data from memory, micro-operations that use an arithmetic logic unit (ALU), micro-operations that use a floating point unit (FPU), and/or cryptographic microoperations. For example, randomly selecting 620 the instruction type may include generating a random number with portions of the range of the random number mapped to respective instruction types in the set of types of available noisy micro-operations. For example, a random number generator (e.g., the random number generator 450) may be used to generate the random number that is used to randomly select 620 the instruction type. In some implementations, a pseudorandom number generator may be used to generate the random number that is used to randomly select 620 the instruction type.

The technique 600 includes fissioning 630 the instruction into a set of micro-operations that includes one or more micro-operations that perform the instruction and a noisy micro-operation of the selected instruction type. The noisy micro-operation does not affect the architectural state (e.g., the architectural state 420). For example, the noisy micro-operation may have a zero register (e.g., the zero register 422) of the architectural state as a destination register. For example, the noisy micro-operation may be a load micro-operation, which may have the zero register as its destination register. The noisy micro-operation may alter a microarchitectural state (e.g., the microarchitectural state 430). Thus, the noisy micro-operation may impact side-channels without changing the final outputs determined by a process that includes the instruction. By randomly selecting 620 the instruction type of the noisy micro-operation to inject during fissioning 630 of the instruction, side-channel signals that might otherwise be exploited in a side-channel attack may be obscured and the side-channel vulnerability factor (SVF) of the processor core may be reduced. In some implementations, the noisy micro-operation is marked as noisy to prevent a cache entry from being updated in response to a cache miss caused by the marked noisy micro-operation. For example, the technique 700 of FIG. 7 may be implemented to prevent certain cache updates.

Additional randomness may be introduced in the noisy micro-operations. In some implementations, fissioning 630 the instruction includes randomly select an address used by the noisy micro-operation from among a memory address space. For example, the memory address space may be a page of memory that has been accessed by a process that includes the instruction.

The technique 600 includes executing 640 the set of micro-operations using one or more execution units of the processor pipeline (e.g., the processor pipeline 104). The set of micro-operations, including the random number of noisy micro-operations, may be executed using multiple different execution units (e.g., ALUs, FPUs, cryptographic units, and/or load/store units). For example, using multiple execution units during a period corresponding to execution of the instruction may serve to mitigate portsmash attacks.

The technique 600 includes retiring 650, responsive to completion of execution of the set of micro-operations, the instruction.

Figure 7:
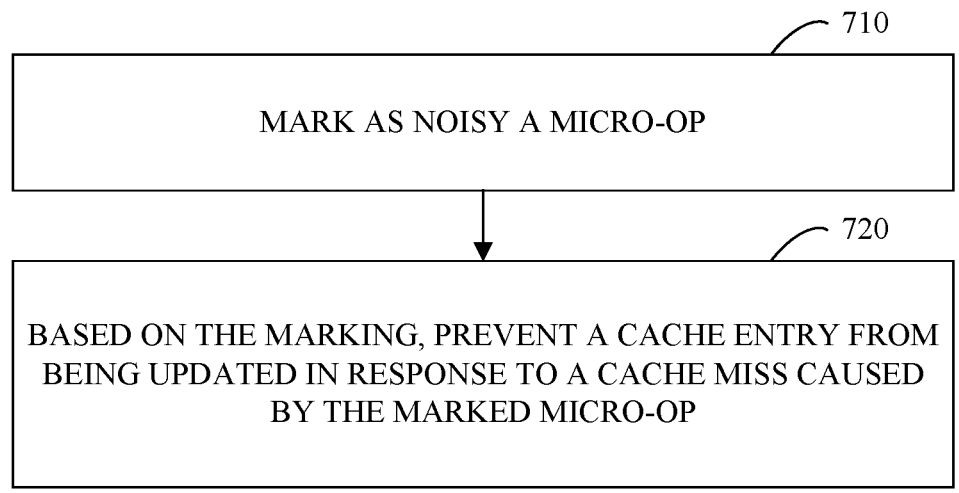
FIG. 7 is a flow chart of an example of a technique for dropping cache updates on cache misses resulting from a noisy micro-operation.

FIG. 7 is a flow chart of an example of a technique 700 for dropping cache updates on cache misses resulting from a noisy micro-operation. The technique 700 includes marking 710 as noisy a noisy micro-operation; and, based on the marking, preventing 720 a cache entry from being updated in response to a cache miss caused by the marked noisy micro-operation. For example, the technique 700 may be implemented using the integrated circuit 101 of FIG. 1. For example, the technique 700 may be implemented using the integrated circuit 400 of FIG. 4.

The technique 700 includes marking 710 as noisy one of the random number of noisy micro-operations. For example, a micro-operation (e.g., a load or a store micro-operation) may be marked 710 by updating a bit stored in data storage circuitry (e.g., a flip-flop or latch) that is associated with the micro-operation. In some implementations, a bit marking the micro-instruction may be stored in a reorder buffer entry.

The technique 700 includes, based on the marking, preventing 720 a cache entry from being updated in response to a cache miss caused by the marked noisy micro-operation. For example, cache miss handling circuitry in a processor memory system (e.g., the processor memory system 418) may be configured to check a bit marking the noisy micro-operation when it causes a cache miss, and drop an update to a corresponding cache entry that would have otherwise resulted from the cache miss if the noisy micro-operation was not so marked.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the integrated circuit 101 (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. An integrated circuit for executing instructions, comprising:
a processor core including a processor pipeline that is configured to execute instructions using an architectural state of the processor core;
a memory configured to store instructions; and
in which the integrated circuit is configured to:
fetch an instruction from the memory into the processor pipeline;
generate a random number;
fission the instruction into a set of micro-operations that includes one or more micro-operations that perform the instruction and the random number of noisy micro-operations, wherein each of the noisy micro-operations does not affect the architectural state;
execute the set of micro-operations using one or more execution units of the processor pipeline; and
retire, responsive to completion of execution of the set of micro-operations, the instruction.

2. The integrated circuit of claim 1, in which the integrated circuit is configured to:
randomly select an instruction type of one of the random number of noisy micro-operations from among a set of types of available noisy micro-operations.

3. The integrated circuit of claim 1, in which the integrated circuit is configured to:
randomly select an address used by one of the random number of noisy micro-operations from among a memory address space.

4. The integrated circuit of claim 3, in which the memory address space is a page of memory that has been accessed by a process that includes the instruction.

5. The integrated circuit of claim 1, in which one of the random number of noisy micro-operations has a zero register of the architectural state as a destination register.

6. The integrated circuit of claim 5, in which the one of the random number of noisy micro-operations is a load micro-operation.

7. The integrated circuit of claim 1, in which the integrated circuit is configured to:
mark as noisy one of the random number of noisy micro-operations; and
based on the marking, prevent a cache entry from being updated in response to a cache miss caused by the marked noisy micro-operation.

8. A method comprising:
fetching an instruction from a memory into a processor pipeline of a processor core that is configured to execute instructions using an architectural state of the processor core;
generating a random number;
fissioning the instruction into a set of micro-operations that includes one or more micro-operations that perform the instruction and the random number of noisy micro-operations, wherein each of the noisy micro-operations does not affect the architectural state;
executing the set of micro-operations using one or more execution units of the processor pipeline; and
retiring, responsive to completion of execution of the set of micro-operations, the instruction.

9. The method of claim 8, comprising:
randomly selecting an instruction type of one of the random number of noisy micro-operations from among a set of types of available noisy micro-operations.

10. The method of claim 8, comprising:
randomly selecting an address used by one of the random number of noisy micro-operations from among a memory address space.

11. The method of claim 10, in which the memory address space is a page of memory that has been accessed by a process that includes the instruction.

12. The method of claim 8, in which one of the random number of noisy micro-operations has a zero register of the architectural state as a destination register.

13. The method of claim 12, in which the one of the random number of noisy micro-operations is a load micro-operation.

14. The method of claim 8, comprising:
marking as noisy one of the random number of noisy micro-operations; and
based on the marking, preventing a cache entry from being updated in response to a cache miss caused by the marked noisy micro-operation.

15. An integrated circuit for executing instructions, comprising:
a processor core including a processor pipeline that is configured to execute instructions using an architectural state of the processor core;
a memory configured to store instructions; and
in which the integrated circuit is configured to:
fetch an instruction from the memory into the processor pipeline;
randomly select an instruction type from among a set of types of available noisy micro-operations;
fission the instruction into a set of micro-operations that includes one or more micro-operations that perform the instruction and a noisy micro-operation of the selected instruction type, wherein the noisy micro-operations does not affect the architectural state;
execute the set of micro-operations using one or more execution units of the processor pipeline; and
retire, responsive to completion of execution of the set of micro-operations, the instruction.

16. The integrated circuit of claim 15, in which the integrated circuit is configured to:
randomly select an address used by the noisy micro-operation from among a memory address space.

17. The integrated circuit of claim 16, in which the memory address space is a page of memory that has been accessed by a process that includes the instruction.

18. The integrated circuit of claim 15, in which the noisy micro-operation has a zero register of the architectural state as a destination register.

19. The integrated circuit of claim 18, in which the noisy micro-operation is a load micro-operation.

20. The integrated circuit of claim 15, in which the integrated circuit is configured to:
mark as noisy the noisy micro-operation; and
based on the marking, prevent a cache entry from being updated in response to a cache miss caused by the marked noisy micro-operation.

21. An integrated circuit for executing instructions, comprising:
a processor core including a processor pipeline that is configured to execute instructions using an architectural state of the processor core;
a memory configured to store instructions;
a means for fetching an instruction from the memory into the processor pipeline;
a means for generating a random number;
a means for fissioning the instruction into a set of micro-operations that includes one or more micro-operations that perform the instruction and the random number of noisy micro-operations, wherein each of the noisy micro-operations does not affect the architectural state;
a means for retiring, responsive to completion of execution of the set of micro-operations, the instruction; and
in which the integrated circuit is configured to:
execute the set of micro-operations using one or more execution units of the processor pipeline.

22. The integrated circuit of claim 21, comprising:
a means for randomly selecting an instruction type of one of the random number of noisy micro-operations from among a set of types of available noisy micro-operations.

23. The integrated circuit of claim 21, comprising:
a means for randomly selecting an address used by one of the random number of noisy micro-operations from among a memory address space.

24. The integrated circuit of claim 21, in which one of the random number of noisy micro-operations has a zero register of the architectural state as a destination register.

25. The integrated circuit of claim 21, comprising:
a means for marking as noisy one of the random number of noisy micro-operations; and
a means for, based on the marking, preventing a cache entry from being updated in response to a cache miss caused by the marked noisy micro-operation.

* * * * *